US012749860B2

(12) United States Patent
George

(10) Patent No.: US 12,749,860 B2
(45) Date of Patent: Sep. 29, 2026

(54) ELECTRIC VEHICLE CHARGING SOCKET CLEANING TOOL AND METHOD

(71) Applicant: International Truck Intellectual Property Company, LLC, Lisle, IL (US)

(72) Inventor: Eric Lee George, Fort Wayne, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 40 days.

(21) Appl. No.: 18/738,347

(22) Filed: Jun. 10, 2024

(65) Prior Publication Data

US 2025/0376133 A1 Dec. 11, 2025

(51) Int. Cl.

| | |
|---|---|
| ***H01R 43/00*** | (2006.01) |
| ***B60L 53/16*** | (2019.01) |
| ***B60S 3/04*** | (2006.01) |
| *B08B 1/12* | (2024.01) |

(52) U.S. Cl.

CPC ............ *H01R 43/002* (2013.01); *B60L 53/16* (2019.02); *B60S 3/048* (2013.01); *B08B 1/12* (2024.01)

(58) Field of Classification Search

CPC .................. H01R 43/002; B08B 9/021; A46B 2200/3093; A46B 2200/3073; A46B 13/02; B60L 53/16

See application file for complete search history.

(56) References Cited

U.S. PATENT DOCUMENTS

| | | | | |
|---|---|---|---|---|
| 2,546,718 | A | | 3/1951 | Billings |
| 2,654,378 | A | | 10/1953 | Longdon et al. |
| 2,682,880 | A | | 7/1954 | Ozmina |
| 2,685,884 | A | | 8/1954 | Heckendorf |
| 2,703,068 | A | | 3/1955 | Hodsdon |
| 2,818,044 | A | | 12/1957 | Booty et al. |
| 3,463,397 | A | | 8/1969 | Mecklin et al. |
| 4,512,810 | A | | 4/1985 | Gahlinger |
| 4,740,169 | A | * | 4/1988 | Gordon .............. H01R 13/5213 439/148 |
| 7,716,922 | B2 | | 5/2010 | Ehlers |
| 7,767,031 | B2 | | 8/2010 | Thomas et al. |
| 7,819,978 | B2 | | 10/2010 | Thomas et al. |

(Continued)

FOREIGN PATENT DOCUMENTS

| | | | | | |
|---|---|---|---|---|---|
| DE | 102023004709 | A | * | 5/2025 | ........... H01R 43/002 |
| GB | 2244641 | A | * | 12/1991 | ............. B24B 23/08 |

OTHER PUBLICATIONS

SAE J1772, Wikipedia, https://en.wikipedia.org/wiki/SAE_J1772, published Apr. 22, 2009, accessed Jul. 31, 2023 (4 pages).

*Primary Examiner* — Laura C Guidotti

(74) *Attorney, Agent, or Firm* — Umang Khanna

(57) ABSTRACT

A cleaning tool for charging sockets of electric vehicles is provided for cleaning charging sockets and terminals included by electric vehicles. The cleaning tool may include a connecting interface, plug fitting, terminal receiving port, abrasive cleaning component, and operatively connected handle. The abrasive cleaning component may at least partially scour the terminals of the electric vehicle charging socket, such as by being rotated. A method for cleaning charging sockets included by electric vehicles using the cleaning tool for charging sockets of electric vehicles is also provided.

14 Claims, 11 Drawing Sheets

(56) References Cited

U.S. PATENT DOCUMENTS

| | | | | |
|---|---|---|---|---|
| 8,146,241 | B1 * | 4/2012 | Thompson, Sr. | H01R 43/002 29/762 |
| 8,627,534 | B2 * | 1/2014 | Van Dyke | B08B 1/12 15/118 |
| 9,543,723 | B1 * | 1/2017 | Steen | B08B 9/00 |
| 2011/0030739 | A1 | 2/2011 | Watkins | |
| 2011/0220150 | A1 | 9/2011 | Villa | |
| 2012/0247503 | A1 | 10/2012 | Strand | |
| 2023/0378704 | A1 * | 11/2023 | Girolstein | A47L 9/0411 |
| 2025/0057309 | A1 * | 2/2025 | Madnick | A46B 13/001 |

* cited by examiner

ELECTRIC VEHICLE CHARGING SOCKET CLEANING TOOL AND METHOD

FIELD OF THE INVENTION

The present disclosure relates to a cleaning tool for charging sockets of electric vehicles. More particularly, the disclosure relates to cleaning charging sockets included by electric vehicles using a tool configured to receive a terminal to scour or otherwise clean the terminal.

BACKGROUND

One of the challenges faced by electric vehicle owners is getting an effective charge from the charging station. The charging socket of an electric vehicle can get dirty quickly with dirt and debris, especially if the vehicle is exposed to harsh weather conditions or road dust. This can affect the quality and efficiency of the charging process, as the dirt and debris can increase the resistance and reduce the conductivity of the electric terminals. Moreover, the dirt and debris can also cause corrosion, wear, and damage to the charging socket and the charging plug, which can compromise the safety and reliability of the electric vehicle.

What is needed is an apparatus to clean the dirt and dust collected on the electric terminals of an EV charger port. What is needed is an apparatus to scour corrosion or other materials that could cause resistance to electrical conductivity from the terminals of an electric vehicle charging socket. What is needed is an apparatus to decrease the resistance of electric terminals. What is needed is an apparatus to efficiently scrub and/or scour electric terminals. What is needed is a method of cleaning the electric terminals of an EV charger port while minimizing the risk of electrocution.

SUMMARY

An aspect of the disclosure advantageously provides an apparatus to clean the dirt, dust, and/or corrosion accumulated on the electric terminals of an EV charger port. An aspect of the disclosure advantageously provides an apparatus to scour corrosion or other materials that could cause resistance to electrical conductivity from the terminals of an electric vehicle charging socket. An aspect of the disclosure advantageously provides an apparatus to decrease the resistance of electric terminals. An aspect of the disclosure advantageously provides an apparatus to efficiently scrub and/or scour the electric terminals. An aspect of the disclosure advantageously provides a method of cleaning the electric terminals of an EV charger port while minimizing the risk of electrocution.

Accordingly, the disclosure may feature a cleaning tool for scouring a terminal of a charging socket of an electric vehicle. The cleaning tool may include a plug fitting extending outwardly from a terminal side of a connecting interface to be removably received by the charging socket. The plug fitting may include terminal receiving ports comprising a rotatable terminal receiving port to receive a DC terminal while inserting the plug fitting into the charging socket. The terminal receiving ports may be constructed using insulated material. The plug fitting may include an abrasive cleaning component provided by an interfacing surface of the terminal receiving ports to receive the terminal.

In another aspect, the terminal receiving ports may further include stationary terminal receiving ports that correspond with a control pilot terminal and a proximity pilot terminal.

In another aspect, the rotatable terminal receiving port may extend from the operator side to the terminal side. The rotatable terminal receiving port may pass through the connecting interface. The DC terminal may be reversibly received by the terminal side of a rotatable terminal receiving port and may be rotated by turning the operator end of the rotatable terminal receiving port.

In another aspect, rotating the terminal end of the rotatable terminal receiving port receiving the DC terminal may move the abrasive cleaning component to at least partially scour the DC terminal.

In another aspect, the abrasive cleaning component may further include an abrasive surface and/or bristles.

According to another embodiment of this disclosure, a cleaning tool is provided for scouring a terminal of a charging socket of an electric vehicle. The cleaning tool may include a plug fitting extending outwardly from a terminal side of a connecting interface which may be removably received by a charging socket. The plug fitting may further include terminal receiving ports which may receive the terminal while inserting the plug fitting into the charging socket. The plug fitting may further include an abrasive cleaning component which may be provided by an interfacing surface of the terminal receiving ports. The cleaning tool may further include an operatively connected handle extending outwardly from an operator side of the connecting interface, away from the plug fitting.

In another aspect, the terminal receiving ports may further include a rotatable terminal receiving port extending from the operator side to the terminal side of the connecting interface. The rotatable terminal receiving port may pass through the connecting interface. A DC terminal may be reversibly received by the terminal end of the rotatable terminal receiving port and may be rotated by turning the operator end of the rotatable terminal receiving port.

In another aspect, rotating the terminal end of the rotatable terminal receiving port receiving the DC terminal may move the abrasive cleaning component to at least partially scour the DC terminal.

In another aspect, the operator end of the rotatable terminal receiving port may further include a grip to be turned by a user.

In another aspect, the terminal receiving ports may include a stationary terminal receiving port.

In another aspect, the abrasive cleaning component may further include an abrasive surface.

In another aspect, the abrasive cleaning component may further include bristles.

In another aspect, the bristles may be angled and may at least partially scour the terminal relative to a rotation direction of the terminal receiving ports.

In another aspect, the operatively connected handle, the connecting interface, and the plug fitting may be constructed using insulated material.

In another aspect, the terminal receiving ports may further include a control pilot receiving port and a proximity pilot receiving port.

In another aspect, the operatively connected handle may further include finger grips.

According to an embodiment of this disclosure, a method is provided for using a cleaning tool for scouring a terminal of a charging socket of an electric vehicle. The method may include (a) removably inserting a plug fitting extending outwardly from a connecting interface into the charging socket. The method may additionally include (b) selectively receiving the terminal via terminal receiving ports, the terminal receiving ports further comprising a rotatable terminal receiving port which may receive a DC terminal. The method may further include (c) contacting the terminal with an abrasive cleaning component provided by an interfacing surface of the terminal receiving ports. Additionally, the method may include (d) manipulating a grip of the rotatable terminal receiving port to rotate and scour the terminal. The method may additionally include (e) scouring the terminal via the abrasive cleaning component.

In another aspect, the cleaning tool may include an operatively connected handle.

In another aspect, the terminal receiving ports may include a control pilot receiving port and a proximity pilot receiving port.

In another aspect, step (e) of the method may additionally include scouring the DC terminal via the abrasive cleaning component. The abrasive cleaning component may include bristles that are angled and at least partially scour the terminal relative to a rotation direction of the terminal receiving ports.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

DETAILED DESCRIPTION

Figure 1:
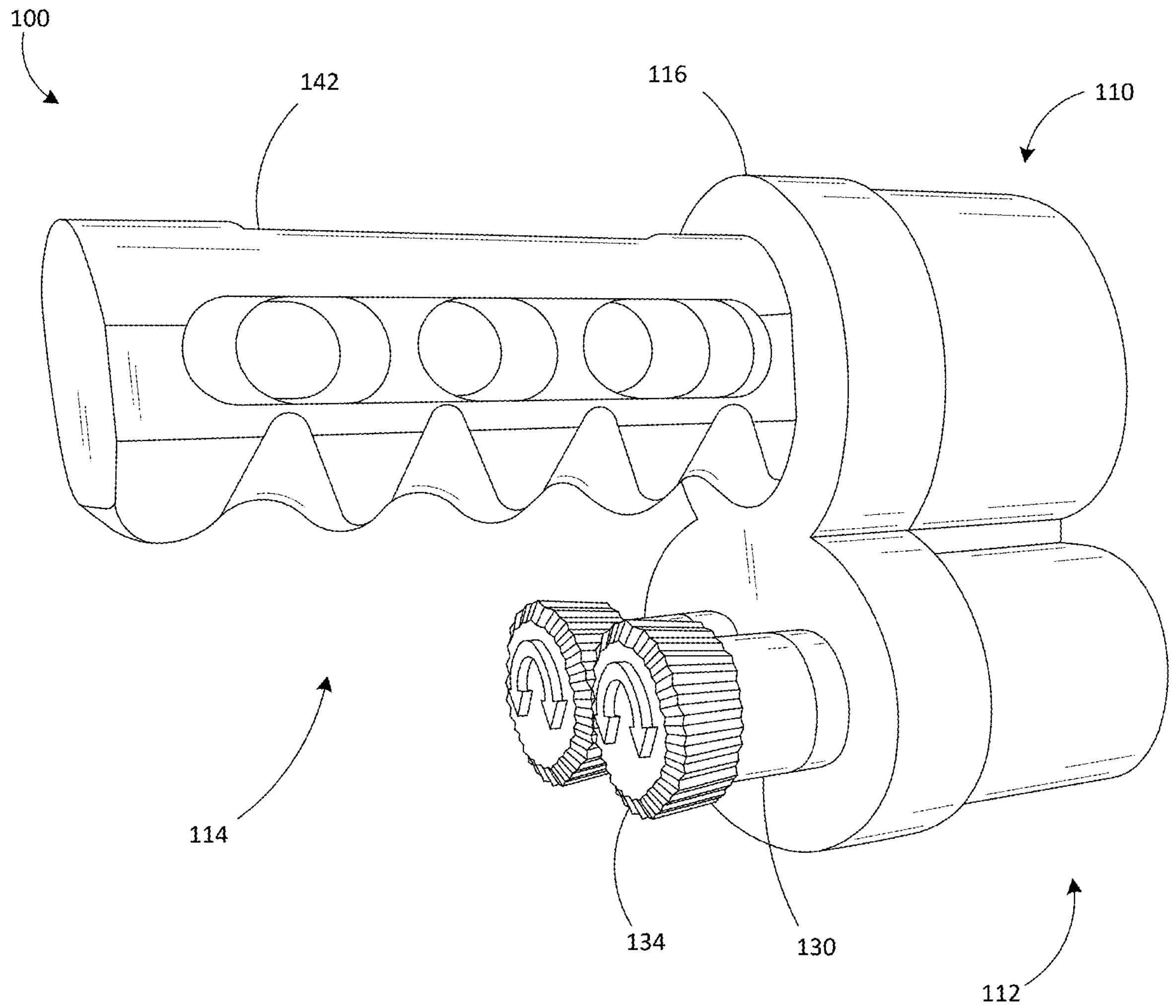
FIG. 1 is a perspective view of a cleaning tool, according to an embodiment of this disclosure.

The following disclosure is provided to describe various embodiments of a cleaning tool for charging sockets of electric vehicles. Skilled artisans will appreciate additional embodiments and uses of the cleaning tools described herein that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

For the purpose of clearly describing the components and features discussed throughout this disclosure, some frequently used terms will now be defined, without limitation. The term terminal, as it is used throughout this disclosure, is defined as an electrical connector that is used to transfer electrical current from a power or grounding source. The term fitting, as it is used throughout this disclosure, is defined as a component that may house at least a portion of the apparatus and may be received by a corresponding socket. The term charging socket, as it is used throughout this disclosure, is defined as a port or other interface operatively connected to a battery of an electric vehicle through which electrical power may be transmitted, such as from a charging plug. The term abrasive, as it is used throughout this disclosure, is defined as a material that may remove a surface material by grinding or rubbing. The term bristle, as it is used throughout this disclosure, is defined as a short stiff coarse hair or filament. The term brush, as it is used throughout this disclosure, is defined as removing with passing strokes. The term operatively connected handle, as it is used throughout this disclosure, is defined as a part that is designed especially to be grapsed by the hand. The term scour, as it is used throughout this disclosure, is defined as to remove dirt and/or debris from. The term DC, as it is used throughout this disclosure, is defined as direct current in the context of electrical power transmission.

Various aspects of the present disclosure will now be described in detail, without limitation. In the following disclosure, a cleaning tool for charging sockets of electric vehicles will be discussed. Those of skill in the art will appreciate alternative labeling of the cleaning tool for charging sockets of electric vehicles as a cleaning tool for electric terminals of an electric vehicle, efficient scouring apparatus for improving conductivity of electric terminals, electric vehicle charger port cleaning tool, or other similar names. Similarly, those of skill in the art will appreciate alternative labeling of the cleaning tool for charging sockets of electric vehicles as a method for cleaning electric charging socket terminals, method of scouring electric terminals of an electric vehicle charging socket, operating a cleaning tool for improving electrical conductivity of terminals provided by a vehicle, method, operation, or other similar names. Skilled readers should not view the inclusion of any alternative labels as limiting in any way.

Referring now to FIGS. 1-11, the cleaning tool for charging sockets of electric vehicles will now be discussed in more detail. The cleaning tool for charging sockets of electric vehicles may include a connecting interface, plug fitting, terminal receiving port, abrasive cleaning component, operatively connected handle, and additional components that will be discussed in greater detail below. The cleaning tool for charging sockets of electric vehicles may operate one or more of these components interactively with other components for cleaning charging sockets included by electric vehicles.

Electric vehicles, also known as electrical vehicles, exist as a broad category, including, but not limited to, cars, trucks, watercrafts, and construction machinery. Those skilled in the art, however, will appreciate the various electric vehicles that may advantageously use an apparatus enabled by this disclosure with their charging sockets to clean the included terminals.

Electric vehicles have various standards for configuring and/or arranging charging sockets. Some notable charging sockets defined by standards that would be appreciated by those of skill in the art include, but are not limited to, the Combined Charging System Combo 1, the Combined Charging System Combo 2, the North American Charging Standard, the SAE J1772, and the CHAdeMO charging systems. Those skilled in the art will appreciate the cleaning tool may be configured to correspond with one of the various charging sockets for which it will be used, without limitation. Additionally, those of skill in the art will appreciate that additional configurations may be provided beyond the illustrative standards provided above. Such additional configurations are intended to be included within the scope of this disclosure.

The connecting interface will now be discussed in greater detail. FIGS. 1-3 and 6, highlight examples of the connecting interface, which may also be shown in other figures. In some embodiments, the connecting interface 116, 216, 316, 616 may enable the connection of various components of the cleaning tool for charging sockets of electric vehicles 100, 200, 300, 400, 600, 700, 800, 900, 1000. In the same or different embodiments, these components may include a plug fitting 110, 210, 410, 610, 710, 810, 910, 1010, and an operatively connected handle 142, 342, 642. However, those skilled in the art will appreciate the various other components that may be added to the apparatus as a whole, which may connect to the connecting interface 116, 216, 316, 616. These include, but are not limited to, sensors, actuators, controllers, power sources, and communication devices.

In some embodiments, the connecting interface 116, 216, 316, 616 may be a substantially flat surface made of an insulated material, however, those skilled in the art will appreciate the various angles and measurements that the connecting interface 116, 216, 316, 616 may be, such as a curved shape or including an angled portion. In some embodiments, the connecting interface may be integrated into one or more other components, for example, a plug fitting and/or operatively connected handle, without limitation. Furthermore, those skilled in the art will appreciate the various amount of materials from which the connecting interface 116, 216, 316, 616 may be constructed. These may include, but are not limited to, plastics, woods, metals, ceramics, and/or glass. Those skilled in the art will also appreciate the use of materials that substantially decrease the risk of electrical shock.

In various embodiments, the connecting interface 116, 216, 316, 616 may further comprise other elements that may assist in the connection of various components. These other elements may include, without limitation, ports, sockets, terminals, connectors, cables, wires, or other suitable elements for establishing various connections.

The plug fitting will now be discussed in greater detail. FIGS. 1, 2, 4, and 6-10, highlight examples of the plug fitting, which may also be shown in other figures. In various embodiments, the plug fitting 110, 210, 410, 610, 710, 810, 910, 1010 may extend outwardly from the connecting interface 116, 216, 316, 616. In other embodiments, the plug fitting 110, 210, 410, 610, 710, 810, 910, 1010 may lock within a part of the connecting interface 116, 216, 316, 616. Those skilled in the art will appreciate the various ways the connecting interface 116, 216, 316, 616, and plug fitting 110, 210, 410, 610, 710, 810, 910, 1010 may be operatively connected with each other and interact.

In some embodiments, the plug fitting 110, 210, 410, 610, 710, 810, 910, 1010 may comprise a terminal side 112, 612, and an operator side 114, 614. The operator side 114, 614 may be distal to the terminal side 112, 612. The plug fitting 110, 210, 410, 610, 710, 810, 910, 1010 may be attached to the connecting interface 116, 216, 316, 616, near the operator side 114, 614 of the plug fitting 110, 210, 410, 610, 710, 810, 910, 1010. In the same or other embodiments, the terminal side 112, 612 of the plug fitting 110, 210, 410, 610, 710, 810, 910, 1010 may interact with a portion of the charging socket of an electric vehicle. The plug fitting 110, 210, 410, 610, 710, 810, 910, 1010 may advantageously provide protection from the terminals of the charging socket as well as providing guidance of the cleaning tool into the charging socket. However, those skilled in the art will appreciate various additional advantages of the plug fitting 110, 210, 410, 610, 710, 810, 910, 1010 after having the benefit of this disclosure.

In various embodiments, the plug fitting 110, 210, 410, 610, 710, 810, 910, 1010 may include a portion having a cylindrical shape, which may correspond with a charging socket in which it may be received. The plug fitting 110, 210, 410, 610, 710, 810, 910, 1010 may be open on one end of the cylindrical shape, while being attached to the connecting interface 116, 216, 316, 616, at the opposite end. Those skilled in the art, however, will appreciate the various shapes of the plug fitting 110, 210, 410, 610, 710, 810, 910, 1010, which may provide advantages for a more accurate connection between the cleaning tool and a charging socket.

In other embodiments, the cleaning tool may have more than one plug fitting 110, 210, 410, 610, 710, 810, 910, 1010. For example, an embodiment of the cleaning tool may have two plug fittings 110, 210, 410, 610, 810, without limitation. Those skilled in the art will appreciate the various number of plug fittings that the cleaning tool may include may be adapted to correspond with the configuration of a charging socket to which it may be inserted for cleaning.

In some embodiments, the plug fitting 110, 210, 410, 610, 710, 810, 910, 1010 may include a locking mechanism which may advantageously provide for a secure connection between the cleaning tool and the electric vehicle. The locking mechanism may interact with various elements to improve the security of a connection between the plug fitting and a corresponding charging socket, such as the charging socket of the electric vehicle, without limitation. Those skilled in the art will appreciate the various elements that the locking mechanism of the plug fitting 110, 210, 410, 610, 710, 810, 910, 1010 may interact with after having the benefit of this disclosure.

In various embodiments, the plug fitting 110, 210, 410, 610, 710, 810, 910, 1010 may be constructed of insulated materials. However, those skilled in the art will appreciate that various additional materials may be used to construct the plug fitting 110, 210, 410, 610, 710, 810, 910, 1010, and in some embodiments do not require all materials used in the construction of the cleaning tool to be insulators. Those skilled in the art will also appreciate that some materials used may have no or low electrical conductivity to substantially reduce the risk of electrical shock. In some embodiments, the plug fitting may be constructed using one or more materials that are not classified as insulators, but those materials that are not insulators may be isolated from contact with the user by the additional insulated materials used to construct the plug fitting.

In some embodiments, the plug fitting 110, 210, 410, 610, 710, 810, 910, 1010 may advantageously house terminal receiving ports, 220, 420, 520, 720, 820, 920, 1020, which will be discussed in greater detail below. Those skilled in the art, however, will realize that various additional elements may be housed within a plug fitting, without limitation.

The terminal receiving port will now be discussed in greater detail. FIGS. 2, 4, 5, and 7-10, highlight examples of the terminal receiving port, which may also be shown in other figures. In some embodiments, as noted above, the terminal receiving ports 220, 420, 520, 720, 820, 920, 1020 may be at least partially housed within the plug fitting. In some embodiments, at least some of the terminal receiving ports 220, 420, 520, 720, 820, 920, 1020 may extend from the terminal side of the plug fitting 110, 210, 410, 610, 710, 810, 910, 1010 to the operator side of the plug fitting 110, 210, 410, 610, 710, 810, 910, 1010. In some embodiments, as will be discussed in greater detail below, one or more terminal receiving ports 220, 420, 520, 720, 820, 920, 1020 may pass through the connecting interface 116, 216, 316, 616 and be rotatable, without limitation.

In other embodiments, the terminal receiving ports 220, 420, 520, 720, 820, 920, 1020 may be attached to the connecting interface 116, 216, 316, 616, via various mechanisms, for example adhesion, molding, welding, threaded insertion, and otherwise, without limitation. Those skilled in the art will appreciate various additional ways the terminal receiving ports 220, 420, 520, 720, 820, 920, 1020 may be at least partially held in place consistent with the scope and spirit of this disclosure.

In various embodiments, the terminal receiving ports 220, 420, 520, 720, 820, 920, 1020 may be constructed using one or more materials. Those skilled in the art will appreciate that at least some of materials used to construct the terminal receiving ports may be non-conductive to electricity, which may substantially reduce the risk of electrical shock while operating a cleaning tool enabled by this disclosure.

In some embodiments, the terminal receiving ports 220, 420, 520, 720, 820, 920, 1020 may have a least partially hollow interior, providing a cavity. An inside surface of such cavity within the within the terminal receiving ports 220, 420, 520, 720, 820, 920, 1020 provide an interfacing surface 224, 424, 524. As will be discuss below, an abrasive cleaning component may be installed to and/or extend inward from the interfacing surface 224, 424, 524 such to interact with a terminal inserted into the interior of the terminal receiving ports 220, 420, 520, 720, 820, 920, 1020. The area within the terminal receiving ports 220, 420, 520, 720, 820, 920, 1020 may advantageously provide enough space for the terminal of the charging socket to be at least substantially inserted inside the terminal receiving ports 220, 420, 520, 720, 820, 920, 1020, which may allow the terminal to interact with the abrasive cleaning component provided by the interfacing surface 224, 424, 524. Those skilled in the art will appreciate the various sizes and depths of the hollow space within the terminal receiving ports 220, 420, 520, 720, 820, 920, 1020, which may correspond with various terminals to be received by each terminal receiving port.

In some embodiments, the interfacing surface 224, 424, 524 of the terminal receiving ports 220, 420, 520, 720, 820, 920, 1020 may further attach to an abrasive cleaning component, which will be discussed in greater detail below. The abrasive cleaning component may be molded into the interfacing surface, adhered, welded, held in place via friction, or otherwise installed or integrated into a terminal receiving port about the interfacing surface.

In some embodiments, various terminal receiving ports 220, 420, 520, 720, 820, 920, 1020 may exist within the cleaning tool having varied lengths, depths, inner diameters, shapes, or other configurations as to correspond with a terminal to be received by such terminal receiving port. In some embodiments, the terminal receiving ports 220, 420, 520, 720, 820, 920, 1020 may comprise ports with different functionality, such as including a rotatable terminal receiving port 130, 230, 430, 530, 630, 830 that may advantageously be rotated around a terminal. In the same or different embodiments, the terminal receiving ports 220, 420, 520, 720, 820, 920, 1020 may comprise stationary terminal receiving ports, 236, 436, which may advantageously be permanently fixed in one position and may provide cleaning operations, or example, by inserting the cleaning tool into a charging socket and removing it. Those skilled in the art will appreciate various additional terminal receiving port configurations that may be provided by a cleaning tool enabled by this disclosure, which may provide additional techniques for movement or lack thereof.

The rotatable terminal receiving port will now be discussed in greater detail. The rotatable terminal receiving port 130, 230, 430, 530, 630, 830 may be provided as a type of terminal receiving port with additional functionality to enhance the cleaning capability of a cleaning tool enabled by this disclosure. The rotatable terminal receiving port 130, 230, 430, 530, 630, 830 may extend through a connecting interface 116, 216, 316, 616 allowing a user to operate the rotatable terminal receiving port 130, 230, 430, 530, 630, 830 from a side of the connecting interface opposite from the charging socket into which it the cleaning tool is inserted.

In one illustrative configuration, a rotatable terminal receiving port 130, 230, 430, 530, 630, 830 may extend as a single piece from a terminal end to an operator end. The terminal end of the rotatable terminal receiving port 130, 230, 430, 530, 630, 830 may extend from the terminal side 112, 612 of the cleaning tool to the operator side 114, 614. In some embodiments, the rotatable terminal receiving port 130, 230, 430, 530, 630, 830 may extend from a terminal end to an operator end, and may pass from its terminal end from the terminal side 112, 612 of the connecting interface 116, 216, 316, 616, through the connecting interface, and extending to an operator end at the operator side 114, 614 of the connecting interface.

The rotatable terminal receiving port 130, 230, 430, 530, 630, 830 may further comprise a grip 134, 334, 534, 634 at its operator end, which may be operated by a user to turn the rotatable terminal receiving port. The grip may be alternatively referred to as a projection, without limitation. The grip 134, 334, 534, 634 may advantageously provide for an area with enhanced grip or interactivity where a user may turn the rotatable terminal receiving port 130, 230, 430, 530, 630, 830. In some embodiments, the grip 134, 334, 534, 634 may comprise a knob, a wheel, or a gear, without limitation. However, those skilled in the art will appreciate various additional elements may exist on the operator end of the rotatable terminal receiving port 130, 230, 430, 530, 630, 830, which may advantageously allow for the movement of the rotatable terminal receiving port 130, 230, 430, 530, 630, 830.

In various embodiments, the rotatable terminal receiving port 130, 230, 430, 530, 630, 830 may be turned in a clockwise and/or counterclockwise direction. When a cleaning tool enabled by this disclosure is interacting with a charging socket of the electrical vehicle, the user may advantageously turn the rotatable terminal receiving port 130, 230, 430, 530, 630, 830, such as via the grip 134, 334, 534, 634, to move the abrasive cleaning component about the received terminal, thus cleaning the terminal with enhanced efficacy.

Stationary terminal receiving ports will now be discussed in greater detail. In some embodiments, one or more stationary terminal receiving ports, 236, 436, will be provided by the terminal receiving ports without the functionality of being rotated. When the cleaning tool is interacting with a charging socket of the electrical vehicle, the user may advantageously insert and at least partially remove the cleaning tool to clean the terminals that are surrounded by the stationary terminal receiving ports, 236, 436. Skilled artisans will appreciate that such insertion and removal of a cleaning tool enabled by this disclosure may additionally provide cleaning capability of alternatively configured terminal receiving ports, for example, those that are rotatable, without limitation.

In the same or other embodiments, various terminal receiving ports may receive different names and may correspond with additional types of terminals to be cleaned. The names of various terminal receiving ports 220, 420, 520, 720, 820, 920, 1020 may advantageously provide assistance in ensuring the location and orientation of the cleaning tool is correct when used. In various embodiments, terminal receiving ports 220, 420, 520, 720, 820, 920, 1020 may comprise a control pilot receiving port 238, 438, 738, 838, 1038 and/or a proximity pilot receiving port 240, 440, 740, 840, 1040. The control pilot receiving port 238, 438, 738, 838, 1038 may receive a control pilot terminal within a charging socket 602. Similarly, the proximity pilot receiving port 240, 440, 740, 840, 1040 may receive a proximity pilot terminal within a charging socket 602. Those of skill in the art will appreciate additional specialized terminal receiving ports that may be included by a plug fitting to correspond with terminals to be cleaned after having the benefit of this disclosure, each of which are intended to be included within the scope of this disclosure.

The terminal receiving ports 220, 420, 520, 720, 820, 920, 1020 may correspond with a variety of terminals of the charging socket. For example, terminal receiving ports 220, 420, 520, 720, 820, 920, 1020 may correspond with a DC terminal 632 in a charging socket 602. Certain elements of the terminal receiving ports 220, 420, 520, 720, 820, 920, 1020 may provide various advantages for the DC terminal 632 over other terminals. These advantages include, but are not limited to, depth, length, and abrasiveness of the abrasive cleaning component 250 included by the terminal receiving port. In some embodiments, the terminal receiving ports configured to receive the DC terminal 632 may be a rotatable terminal receiving port 130, 230, 430, 530, 630, 830.

Figure 2:
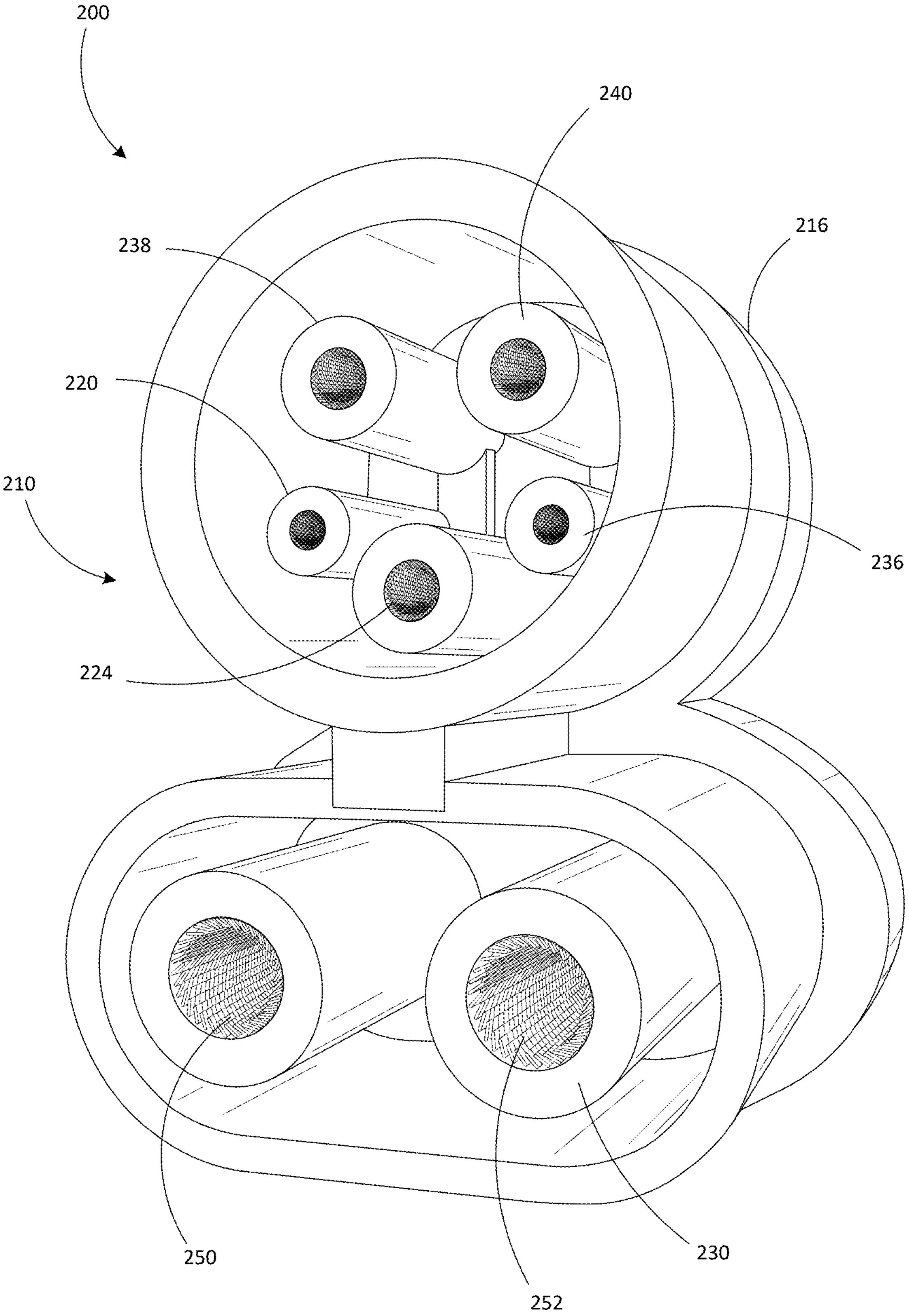
FIG. 2 is a perspective view of a cleaning tool, according to an embodiment of this disclosure.
Figure 5:
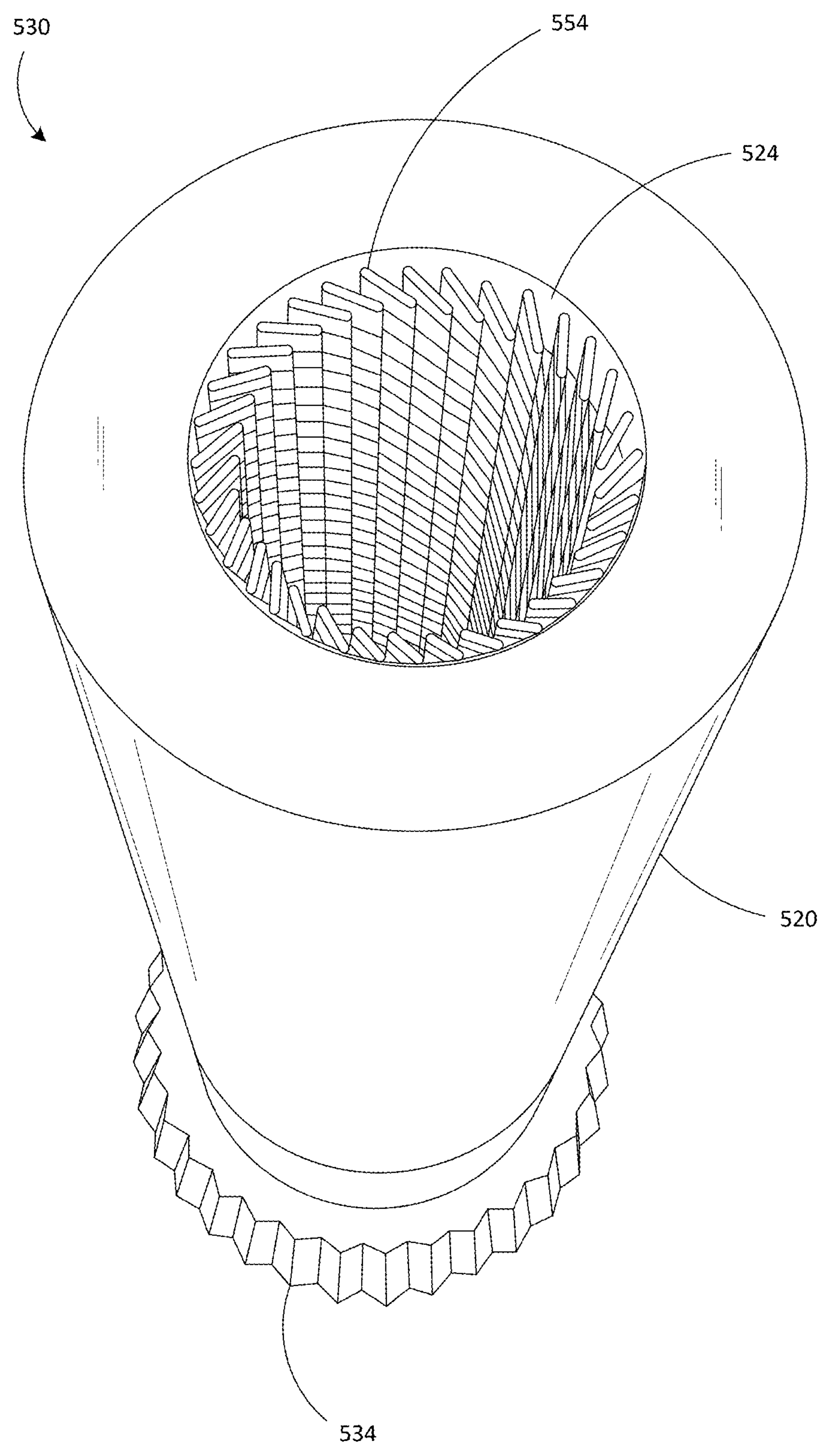
FIG. 5 is a perspective view of a terminal receiving port, according to an embodiment of this disclosure.

The abrasive cleaning component will now be discussed in greater detail. FIGS. 2 and 5 highlight an example of the abrasive cleaning component, which may also be shown in other figures. In some embodiments, the abrasive cleaning component 250 may be housed within the terminal receiving ports 220, 420, 520, 720, 820, 920, 1020, however, those skilled in the art will appreciate the other areas that the abrasive cleaning component 250 may be housed within, without limitation. In the same or other embodiments, the abrasive cleaning component 250 may line at least part of the interfacing surface 224, 424, 524 of the terminal receiving ports 220, 420, 520, 720, 820, 920, 1020.

In various embodiments, the abrasive cleaning component 250 may comprise an abrasive surface 252, 452. The abrasive surface 252, 452 may comprise of an abrasive material, including, but not limited to, silicon carbide, aluminum oxide, garnet, stainless steel, cloth, bristles, plastics, cellulose sponges, abrasive sponges, and sea sponges. However, those skilled in the art will appreciate the various materials that one may use as an abrasive material after having the benefit of this disclosure.

In some embodiments, the abrasive cleaning component 250 may further comprise bristles 454, 554, 754 that may line at least part of the interfacing surface 224, 424, 524 of the terminal receiving ports 220, 420, 520, 720, 820, 920, 1020. Bristles 454, 554, 754 may advantageously clean the terminals when the cleaning tool is in use. In the same or different embodiments, the bristles 454, 554, 754 may be angled to advantageously scour the terminal relative to a direction of the terminal receiving ports 220, 420, 520, 720, 820, 920, 1020 when the cleaning tool is in use. In embodiments where angled bristles are installed to a rotatable terminal receiving port 130, 230, 430, 530, 630, 830, the scouring and/or scrubbing properties of the bristles may differ depending on the direction that the rotatable terminal receiving port 130, 230, 430, 530, 630, 830 are turned. Those skilled in the art will appreciate the additional other angles, widths, numbers, and lengths of the bristles, 454, 554, 754 that may be within the terminal receiving ports 220, 420, 520, 720, 820, 920, 1020 that are consistent with the scope and spirit of this disclosure and may be used with a cleaning tool enabled by this disclosure.

Figure 3:
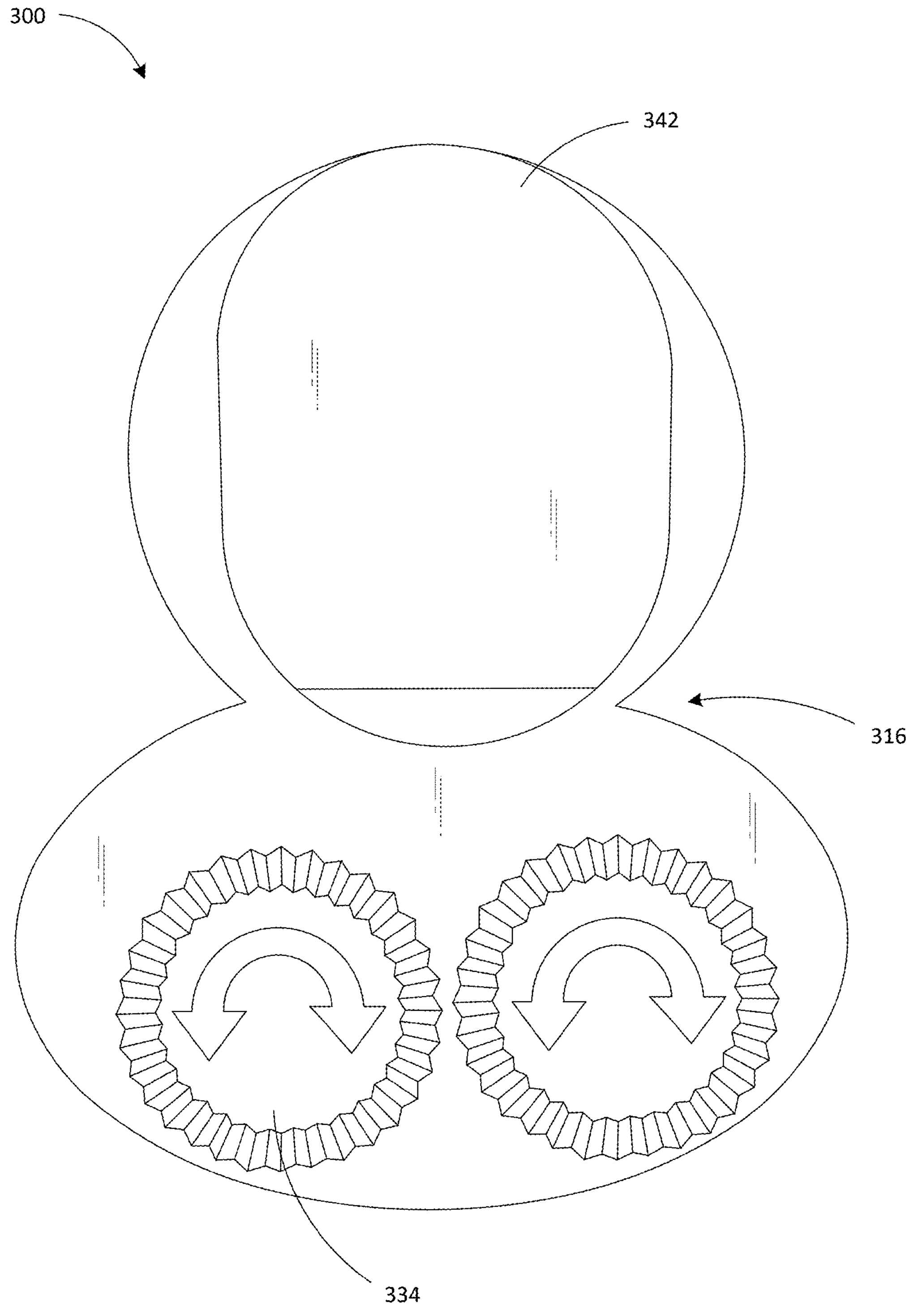
FIG. 3 is a rear elevation view of a cleaning tool, according to an embodiment of this disclosure.
Figure 4:
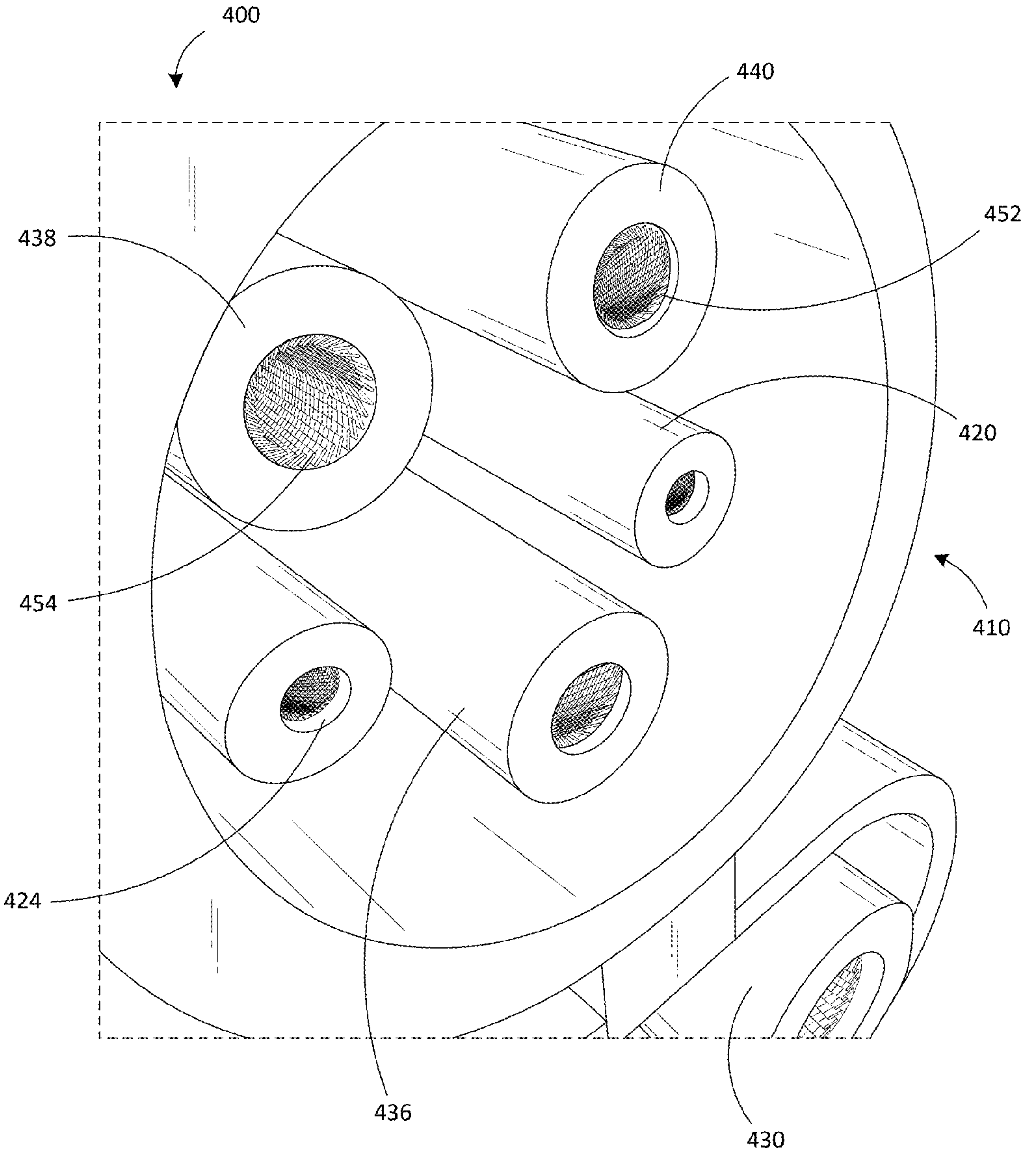
FIG. 4 is a partial perspective view of a cleaning tool, according to an embodiment of this disclosure.
Figure 6:
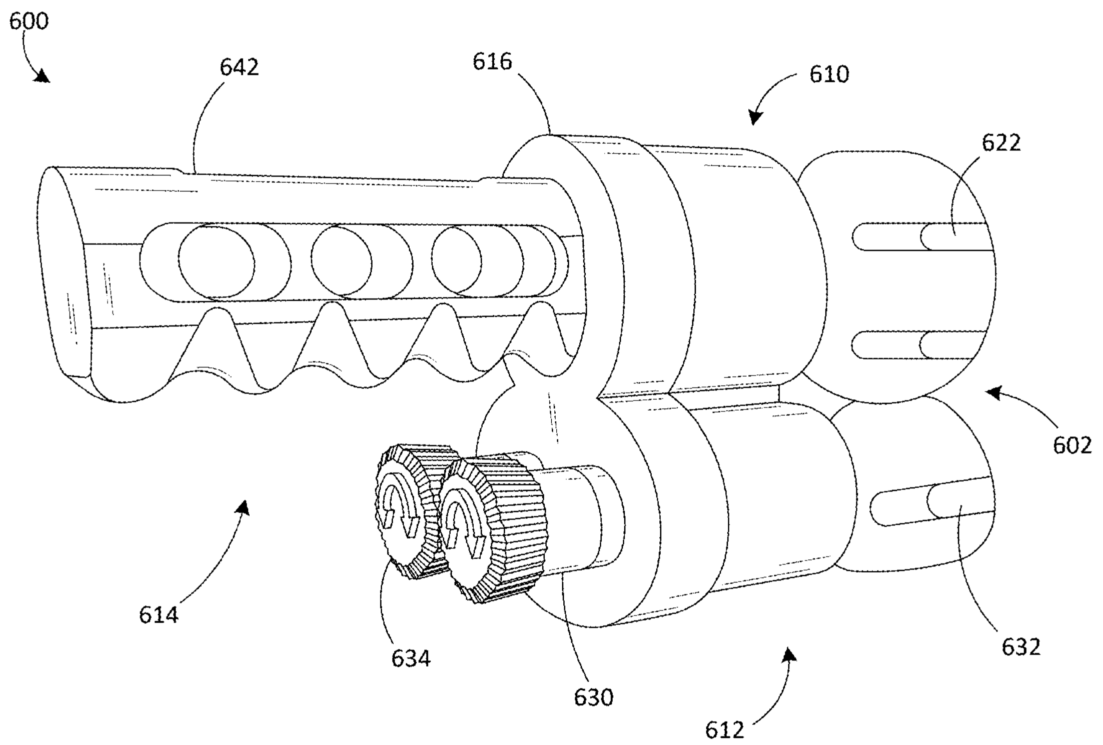
FIG. 6 is a perspective view of a cleaning tool oriented to be received by a charging socket, according to an embodiment of this disclosure.
Figure 7:
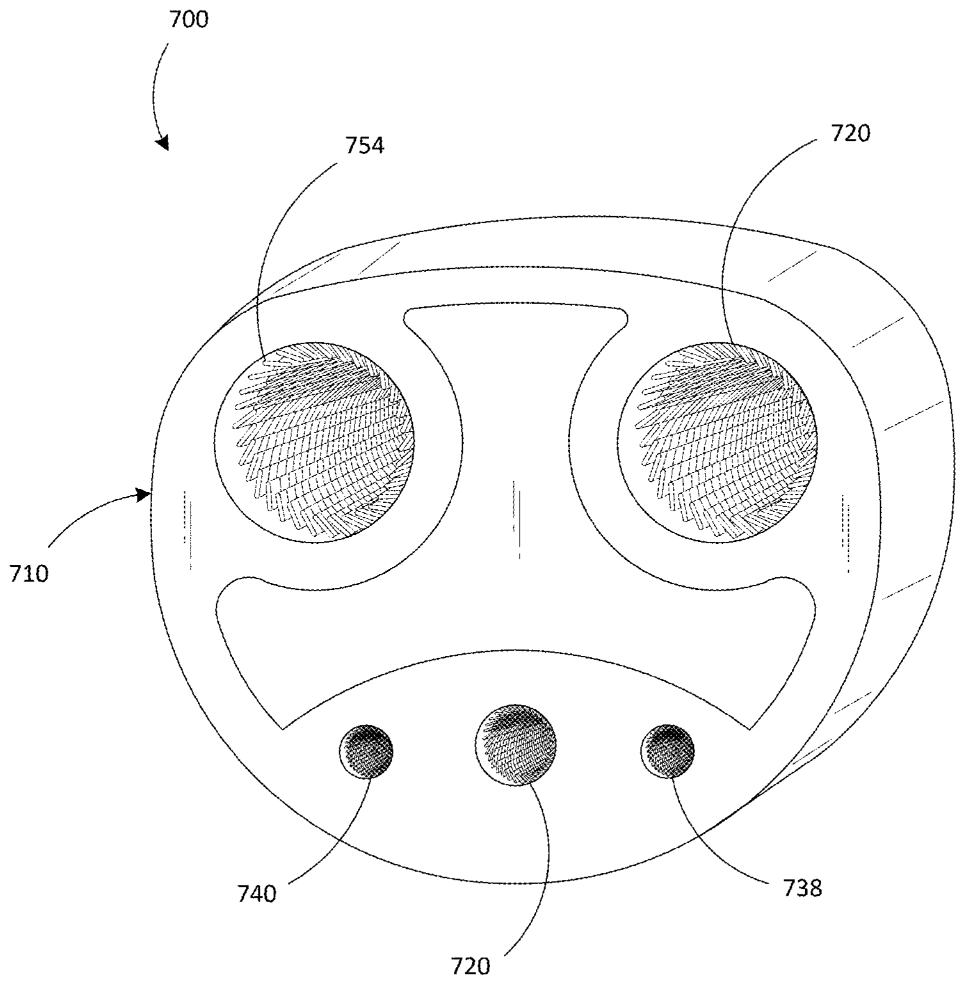
FIG. 7 is a perspective view of a cleaning tool, according to an alternative embodiment of this disclosure.
Figure 8:
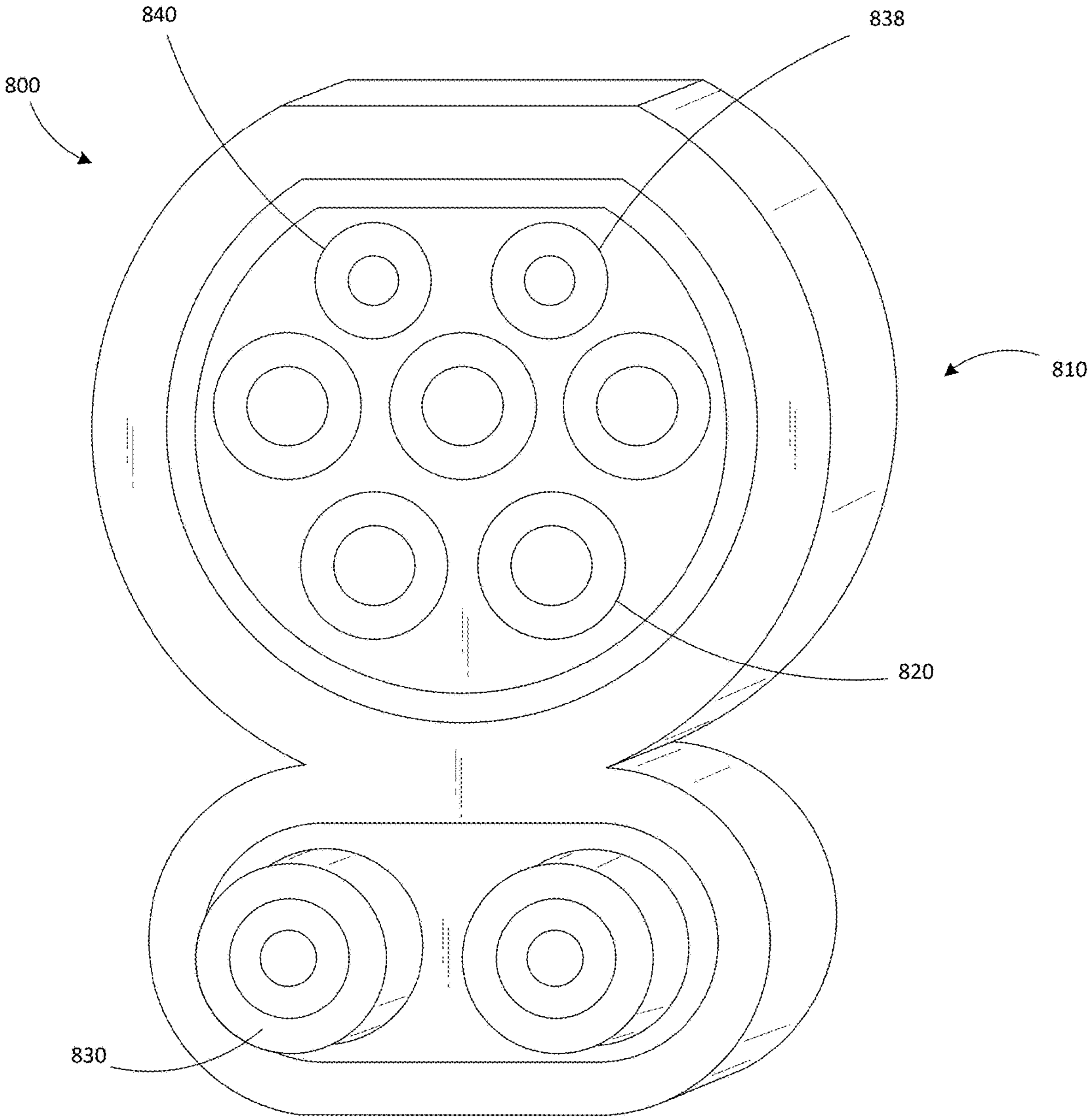
FIG. 8 is a perspective view of a cleaning tool, according to an alternative embodiment of this disclosure.
Figure 9:
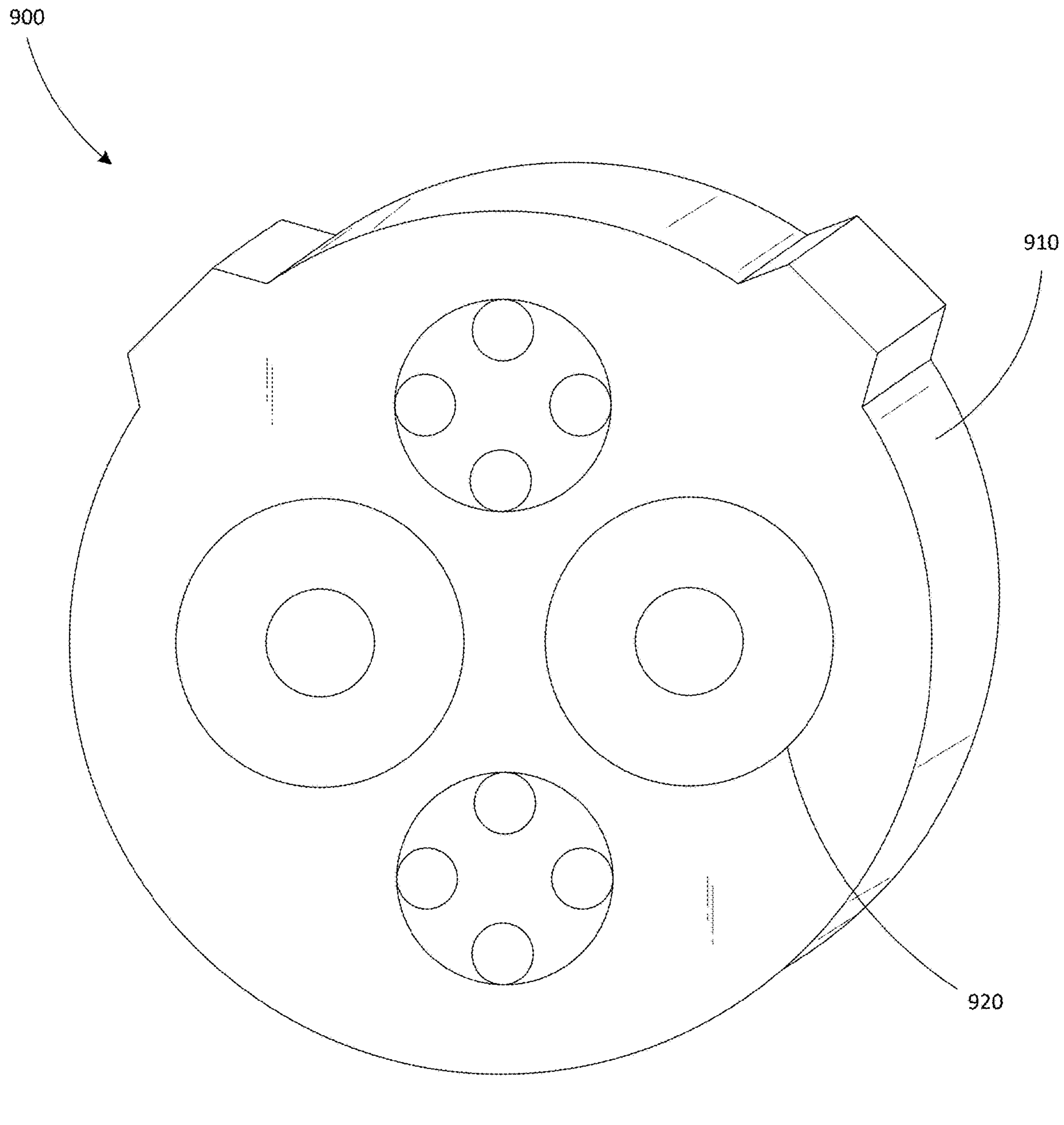
FIG. 9 is a perspective view of a cleaning tool, according to an alternative embodiment of this disclosure.
Figure 10:
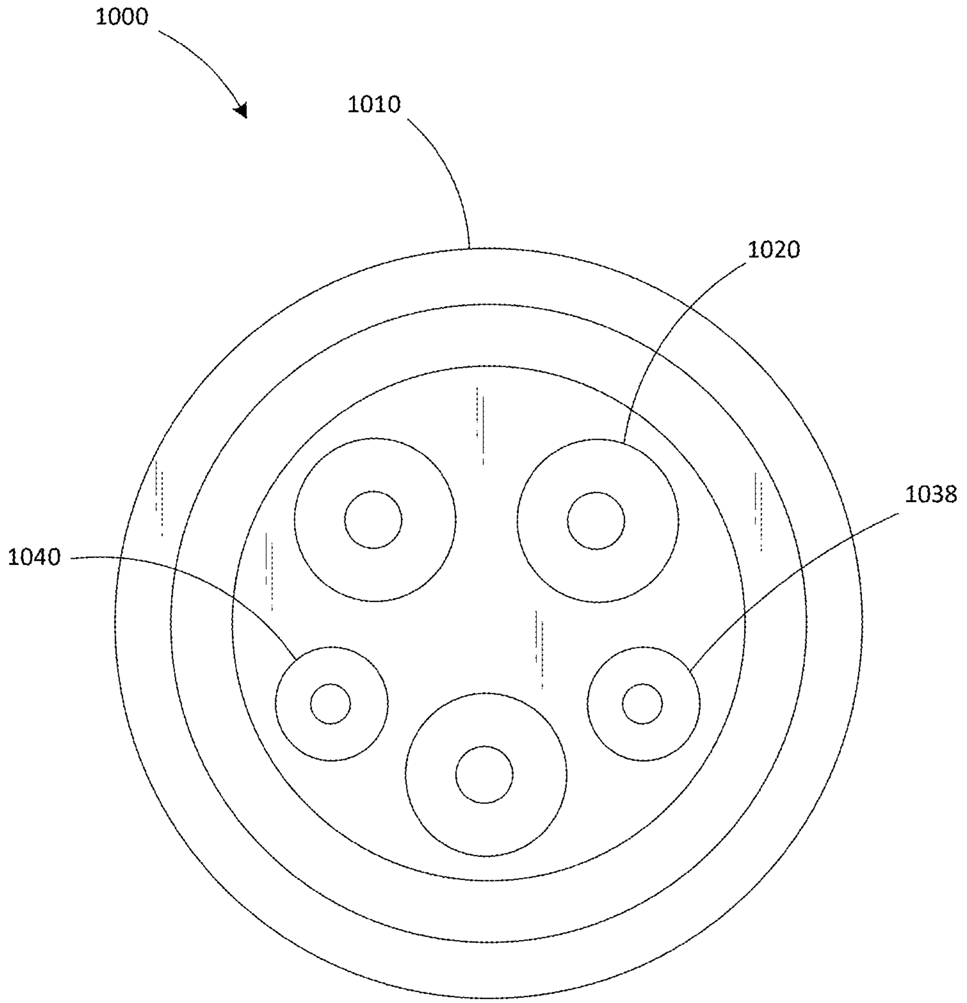
FIG. 10 is a perspective view of a cleaning tool, according to an alternative embodiment of this disclosure.

The operatively connected handle will now be discussed in greater detail. FIGS. 1, 3, and 6 highlight examples of the operatively connected handle, which may also be shown in other figures. In various embodiments, the operatively connected handle 142, 342, 642 may extend outwardly from the connecting interface 116, 216, 316, 616. However, in other embodiments, the operatively connected handle 142, 342, 642 may attach to the plug fitting 110, 210, 410, 610, 710, 810, 910, 1010 or terminal receiving ports 220, 420, 520, 720, 820, 920, 1020, without limitation.

In some embodiments, the operatively connected handle 142, 342, 642 may extend outwardly from the connecting interface 116, 216, 316, 616 via a variety of configurations, including, but not limited to, screwing, welding, molding, or removably locking into each other. Those skilled in the art will appreciate additional various ways the operatively connected handle 142, 342, 642 may be connected to any other part of the cleaning tool that are intended to be included within the scope of this disclosure.

In the same or different embodiments, the operatively connected handle 142, 342, 642 may further comprise finger grips. The finger grips may be provided as grooves along at least partially the length of the operatively connected handle 142, 342, 642 and may advantageously align with a user's hand when grasping the operatively connected handle 142, 342, 642. Those skilled in the art will appreciate the various other elements that may be added to the operatively connected handle 142, 342, 642 to improve grip and make it easier to use a cleaning tool enabled by this disclosure, without limitation.

In various embodiments, the operatively connected handle 142, 342, 642 may be constructed using one or more materials, including, but not limited to, plastics, glass, and ceramics, insulators, and/or other materials that would be apparent to a person of skill in the art after having the benefit of this disclosure. More specifically, those skilled in the art will appreciate the use of additional types of material that may be non-conductive of electricity to substantially reduce the risk of electrical shock.

In operation, a method may be provided for cleaning charging sockets included by electric vehicles. Those of skill in the art will appreciate that the following methods are provided to illustrate an embodiment of the disclosure and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 11:
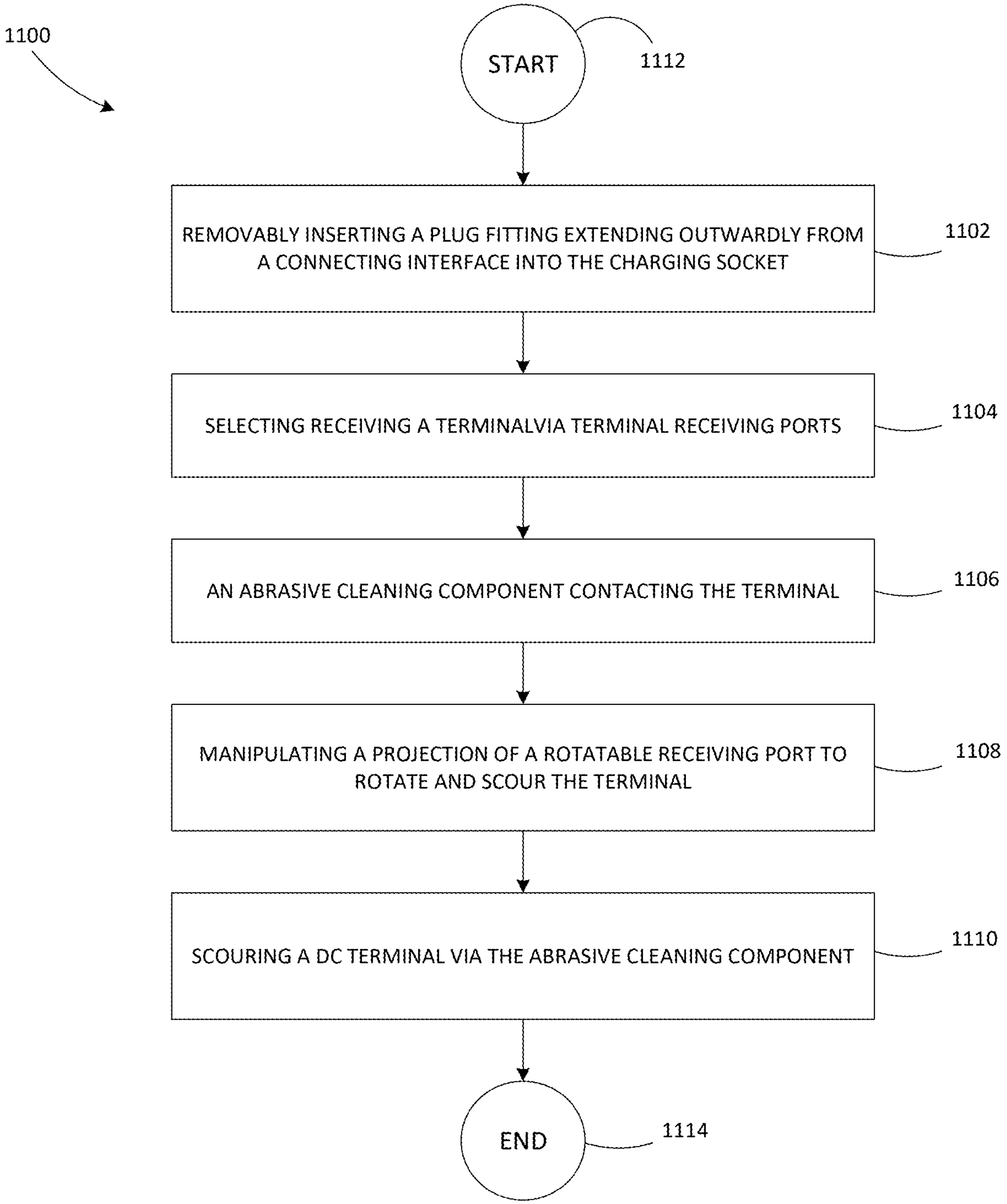
FIG. 11 is a flow chart view of an illustrative method of using a cleaning tool for scouring a terminal of a charging socket of an electric vehicle.

Referring now to flowchart 1100 of FIG. 11, an illustrative method of using a cleaning tool for scouring a terminal of a charging socket of an electric vehicle will now be described, without limitation. Starting with Block 1112, the operation may begin by removably inserting a plug fitting extending outwardly from a connecting interface into the charging socket (Block 1102). The tool may then selectively receive a terminal via terminal receiving parts (Block 1104). Next, an abrasive cleaning component may then contact the terminal (Block 1106). Then, a user may manipulate a grip of a rotatable receiving port to rotate and scour the terminal (Block 1108). Finally, a DC terminal and other terminals may then be scoured via the abrasive cleaning component (Block 1110). The operation may then terminate at Block 1114 once the terminals are cleaned to the desired level of the user.

What is claimed is:

1. A cleaning tool for scouring a terminal of a charging socket of an electric vehicle comprising:

a plug fitting extending outwardly from a terminal side of a connecting interface to be removably received by the charging socket, further comprising:

terminal receiving ports comprising a rotatable terminal receiving port that extends from the operator side to the terminal side of the connecting interface to receive a DC terminal while inserting the plug fitting into the charging socket, the terminal receiving ports constructed using insulated material, and an abrasive cleaning component provided by an interfacing surface of the terminal receiving ports to receive the terminal;

wherein the terminal is scoured upon moving the terminal receiving ports about the terminal;

wherein the rotatable terminal receiving port passes through the connecting interface to extend outwardly on the terminal side to a terminal end of the rotatable receiving port and extend outwardly on the operator side to an operator end of the rotatable terminal receiving port;

wherein the DC terminal is reversibly received by the terminal end of the rotatable terminal receiving port that is rotated by turning the operator end of the rotatable terminal receiving port; and wherein the connecting interface comprises an operator side facing away from the terminal side.

2. The cleaning tool of claim 1, wherein the terminal receiving ports further comprise:

stationary terminal receiving ports that correspond with a control pilot terminal and a proximity pilot terminal of the charging socket.

3. The cleaning tool of claim 1, wherein turning the operator end of the rotatable terminal receiving port moves the abrasive cleaning component about the DC terminal to at least partially scour the DC terminal received by the terminal end of the rotatable terminal receiving port.

4. The cleaning tool of claim 1, wherein the abrasive cleaning component further comprises an abrasive surface and/or bristles.

5. A cleaning tool for scouring a terminal of a charging socket of an electric vehicle comprising:

a plug fitting extending outwardly from a terminal side of a connecting interface to be removably received by the charging socket, further comprising:

terminal receiving ports to receive the terminal while inserting the plug fitting into the charging socket;

the terminal receiving ports comprising a rotatable terminal receiving port extending from the operator side to the terminal side of the connecting interface;

wherein the rotatable terminal receiving port passes through the connecting interface and extends outwardly from the operator side and the terminal side of the connecting interface; and wherein a DC terminal is reversibly received by a terminal end of the rotatable terminal receiving port that is rotated by turning an operator end of the rotatable terminal receiving port;

an abrasive cleaning component provided by an interfacing surface of the terminal receiving ports to contact the terminal;

an operatively connected handle extending outwardly from an operator side of the connecting interface away from the plug fitting.

6. The cleaning tool of claim 5, wherein rotating the terminal end of the rotatable terminal receiving port about the DC terminal moves the abrasive cleaning component about the DC terminal to at least partially scour the DC terminal.

7. The cleaning tool of claim 5, wherein the operator end of the rotatable terminal receiving port further comprises a grip to be turned by a user.

8. The cleaning tool of claim 5, wherein the terminal receiving ports comprise a stationary terminal receiving port.

9. The cleaning tool of claim 5, wherein the abrasive cleaning component further comprises an abrasive surface.

10. The cleaning tool of claim 5, wherein the abrasive cleaning component further comprises bristles.

11. The cleaning tool of claim 10, wherein the bristles are angled and at least partially scour the terminal relative to a rotation direction.

12. The cleaning tool of claim 5, wherein the operatively connected handle, the connecting interface, and the plug fitting are constructed using insulated material.

13. The cleaning tool of claim 5, wherein the terminal receiving ports further comprise a control pilot receiving port and a proximity pilot receiving port.

14. The cleaning tool of claim 5, wherein the operatively connected handle further comprises finger grips.

* * * * *